(12) United States Patent
Bosson

(10) Patent No.: US 6,460,817 B1
(45) Date of Patent: Oct. 8, 2002

(54) CPU HOLDER

(76) Inventor: Peter Thomas Bosson, 68 Greenland Quay, Rotherhithe London SE16 1RR (GB)

( * ) Notice: Subject to any disclaimer, the term of this patent is extended or adjusted under 35 U.S.C. 154(b) by 0 days.

(21) Appl. No.: 09/541,528

(22) Filed: Apr. 3, 2000

(51) Int. Cl.[7] .................................................. A47H 1/10
(52) U.S. Cl. ........................ 248/317; 248/637; 248/674; 248/316.1; 248/924
(58) Field of Search ................................. 248/674, 917, 248/918, 924, 309.1, 317, 316.1, 223.41, 637

(56) References Cited

U.S. PATENT DOCUMENTS

| | | | | | |
|---|---|---|---|---|---|
| 4,858,878 | A | * | 8/1989 | Gassaway | 248/551 |
| 5,131,620 | A | * | 7/1992 | Boundy | 248/674 |
| 5,393,025 | A | * | 2/1995 | Franklin | 248/317 |
| D361,462 | S | * | 8/1995 | Newham | D6/567 |
| 5,683,066 | A | * | 11/1997 | McCann | 248/295.11 |
| 5,897,179 | A | * | 4/1999 | Wade | 312/223.6 |
| 5,927,668 | A | * | 7/1999 | Cyrell | 248/317 |
| 5,961,084 | A | * | 10/1999 | Brand et al. | 248/248 |
| 6,029,580 | A | * | 2/2000 | Alfonso et al. | 108/26 |
| 6,065,727 | A | * | 5/2000 | Fitzgerald et al. | 248/302 |
| 6,098,944 | A | * | 8/2000 | Pangborn et al. | 248/317 |
| 6,318,692 | B1 | * | 11/2001 | Cyrell | 248/317 |
| 6,340,145 | B1 | * | 1/2002 | Tagami et al. | 248/317 |

* cited by examiner

*Primary Examiner*—Leslie A. Braun
*Assistant Examiner*—Naschica S. Morrison
(74) *Attorney, Agent, or Firm*—Dilworth & Barrese LLP

(57) ABSTRACT

A holder for a central processing unit (CPU) is disclosed which includes an adjustable perimeter support frame attachable to the underside of a desk to suspend the CPU therefrom but out of contact with the floor. The frame has four sides, each comprising a female section and a male section slidable therein. Two opposite corners of the frame comprise a pair of female sections connected together to form an L-shaped frame member, the remaining two corners of the frame comprising two male members connected together to provide an L-shaped frame part. The L-shaped male frame sections are slidable within the L-shaped female frame sections so that the length of all of the sides can be readily adjusted to suit the size of the CPU to be supported therein. Locking means fix the position of the movable frame parts when tightened so that the frame tightly grips the CPU. A mounting plate can be slidably mounted on the top of the frame to attach it to the desk undersurface.

11 Claims, 6 Drawing Sheets

CPU HOLDER

BACKGROUND OF THE INVENTION

This invention relates to a holder for supporting a computer central processing unit (CPU) underneath a desk or work station and out of contact with the floor.

Holders are known which suspend the CPU unit from the underside of a desk thereby freeing up valuable working space on the desktop which can be put to other uses. Furthermore, because the CPU is out of contact with the floor but beneath the desk, the risk of it being kicked or otherwise disturbed by the user is avoided.

A known CPU holder comprises a main L-shaped supporting bracket, the top end of which is attached to the underside of a desk. A support member with an upstanding edge is slidably attached to the L-shaped foot of the main supporting member and is slidable laterally relative thereto. A second arm with a downwardly depending edge is mounted on the main support member so as to be slidable vertically relative thereto. In use, a CPU is placed in a vertical orientation on the L-shaped foot of the main support member and the laterally movable first arm is moved inwardly toward the CPU until its upstanding edge contacts and grips its side face. The second arm is then moved vertically downwardly until it engages the top of the CPU and the downwardly depending side edge thereof is moved inwardly to grip the side face of the CPU. This prior art CPU holder has numerous parts and is therefore expensive to manufacture. Furthermore, it does not grip the CPU around the whole of its periphery so there is a risk that it can fall out of the holder if the adjustable arms are not properly tightened and/or the user kicks or otherwise disturbs it while working at the desk to which it is attached.

SUMMARY OF THE INVENTION

It is an object of the present invention therefore to provide an under-desk CPU holder which is attractive in appearance, cheap and easy to manufacture, has a minimum number of parts and is easy to use.

According to the invention there is provided an under-desk CPU holder comprising a perimeter support frame adapted to grip and hold a CPU when inserted therein around the whole of its external periphery and mounting means for attaching said frame to the underside of a desk or worksurface, the frame having a plurality of sides which are constructed and arranged to be variable in length so that the sides of the frame can be adjusted to fit closely around the CPU, and locking means to fix and retain the selected length of each frame side whereby the frame grips the CPU around its perimeter and retains it therein.

Preferably the frame has four sides each of which has an inside surface which contacts and grips a face of the CPU when inserted therein, each frame side comprising a first part which is slidable relative to a second part.

In a preferred embodiment, the support frame comprises four L-shaped frame members, each of said members being slidable relative to a contiguous frame member to adjust the length of a side of the frame. Conveniently two of the L-shaped frame members slidable fit into the other two L-shaped frame members.

Preferably each L-shaped frame member comprises two identical extruded sections of the same cross-sectional configuration which are connected together at a corner junction. Suitably, the frame members forming a first pair of opposite corners of the frame have an identical cross sectional configuration, the frame members forming the other two opposite corners of the frame having a cross-sectional configuration which is identical to each other but different to the frame members forming said first pair of corners.

In the preferred embodiment, the first frame side part has an internal and external surface, the external surface having a pair of parallel L-shaped slots extending the whole length thereof, each second frame part fitting over and sliding along the external surface of the first frame side part and having an undersurface with a pair of parallel L-shaped ribs extending therefrom, each of said ribs being received and retained in said L-shaped slots and being slidable therealong.

The preferred embodiment also includes a third inverted T-shaped slot formed in the external surface of each first frame side part which extends along the whole length thereof parallel to and between said first pair of L-shaped slots, each second frame side part having a T-shaped rib extending from the undersurface thereof which is received and retained in the said third slot and slidable therealong.

Conveniently the locking means comprises a grub screw which extends into and engages with the side walls of the third slot to lock the first frame part in position relative to the second frame part.

Preferably, a pair of parallel mounting slots are formed in the external surface of the first member, each slot providing access to the interior of its associated hollow L-shaped rib.

The mounting means can take any convenient form but preferably is a bracket which can be secured to the undersurface of the desk or worksurface using screws or other suitable fixings, said plate having a pair of parallel L-shaped flanges extending therefrom at 90° to the plane of the plate, each of said flanges being slidably received in one of said mounting slots to releasably attach said plate to the perimeter support frame.

Preferably the first and second frame parts are extruded metal sections of constant cross section along the whole of their length, the first support frame parts being of a first cross sectional configuration and the second support frame parts being of a different cross sectional configuration. The extruded sections can however be made of a plastics material.

BRIEF DESCRIPTION OF THE DRAWING

A preferred CPU holder of the present invention will now be described, by way of example only, with reference to the accompanying drawings, in which.

DETAILED DESCRIPTION OF THE PREFERRED EMBODIMENTS

Figure 1:
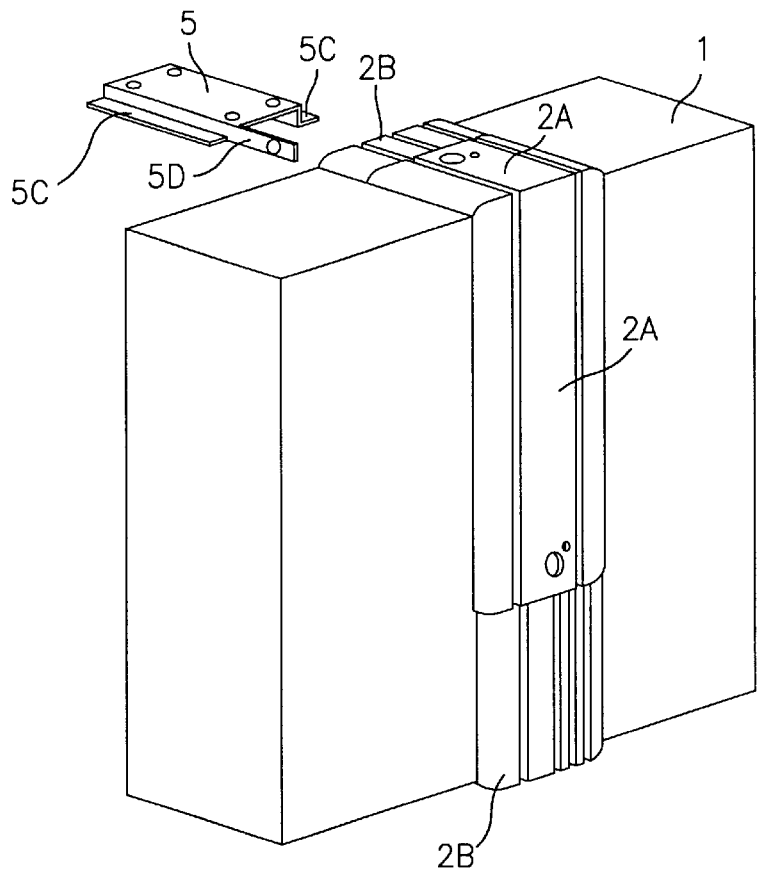
FIG. 1 shows a CPU holder of the present invention.
Figure 2:
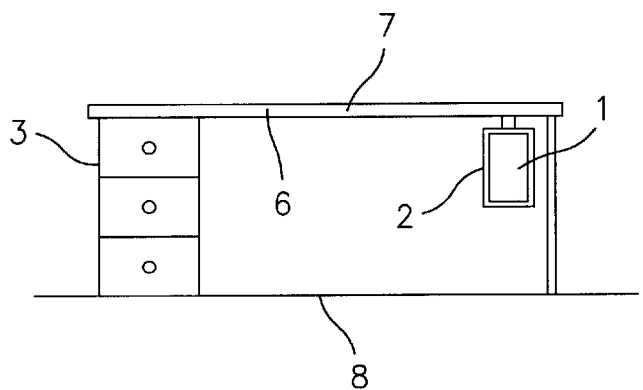
FIG. 2 shows the CPU holder shown in FIG. 1 but attached to the undersurface of a desk.
Figure 3:
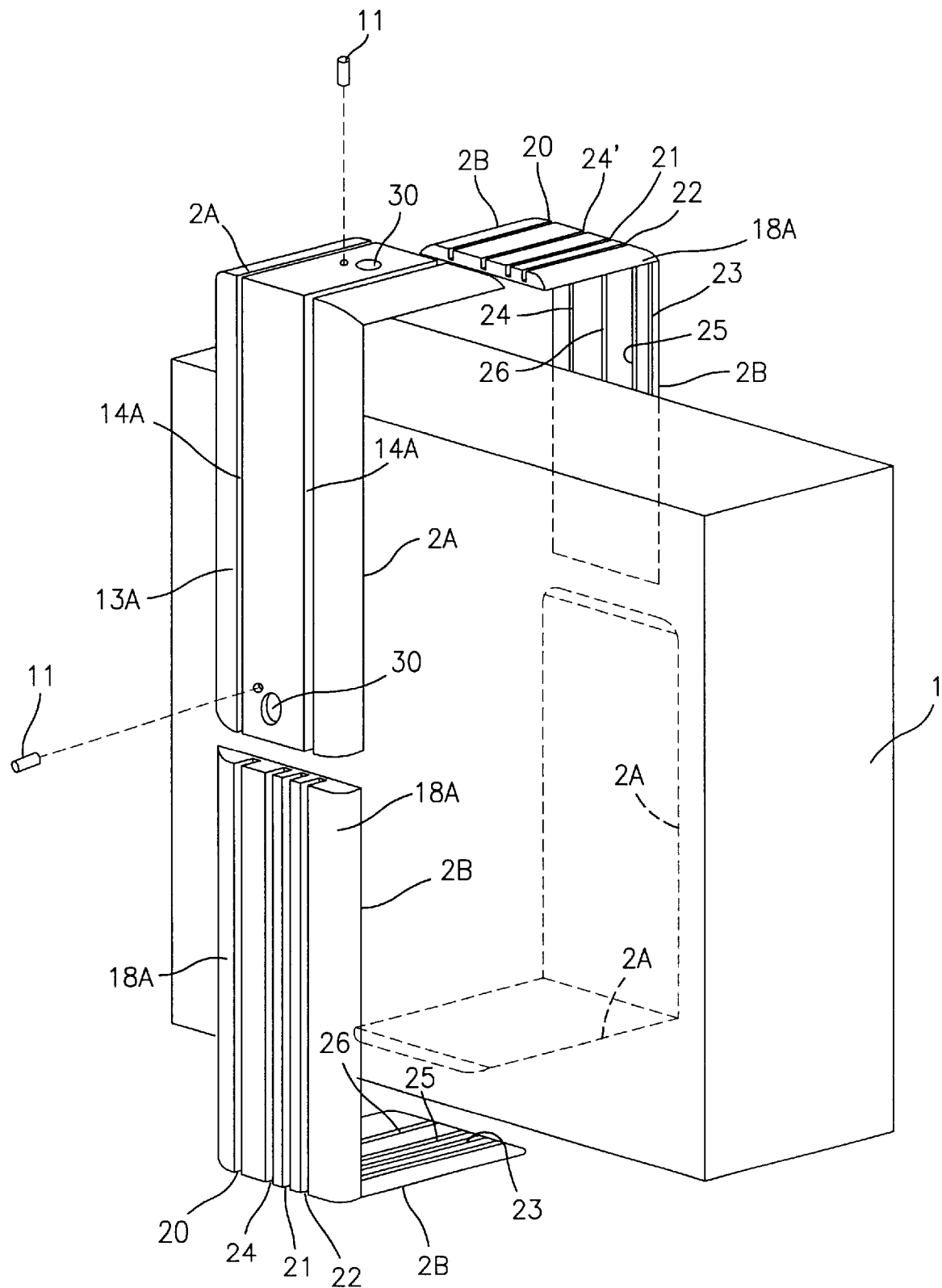
FIG. 3 is an exploded view of the holder shown in FIG. 1 but rotated through 90°.

Referring now to FIGS. 1 and 2, there is shown a central processing unit (CPU) 1 which is mounted in and supported by a perimeter support frame 2 attached to desk 3. Mounting means in the form of a plate 5 are attachable to the top of the perimeter frame 2 in a manner to be described hereafter. Mounting plate 5 is secured to undersurface 6 of desk top 7 thereby suspending the CPU 1 from said undersurface but out of contact with the floor 8.

Figure 4:
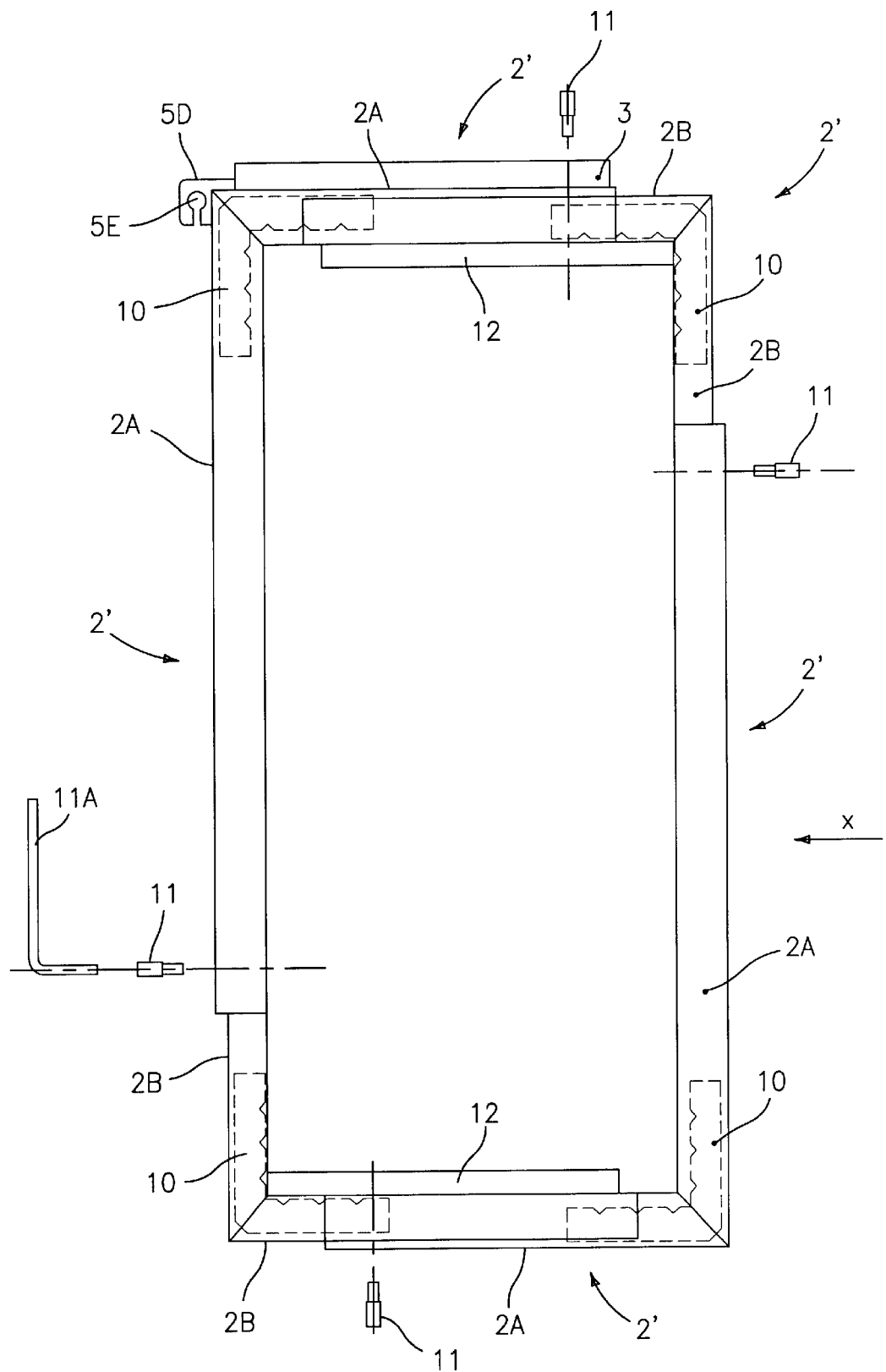
FIG. 4 is a side view of the CPU holder shown in FIGS. 1–3.
Figure 5:
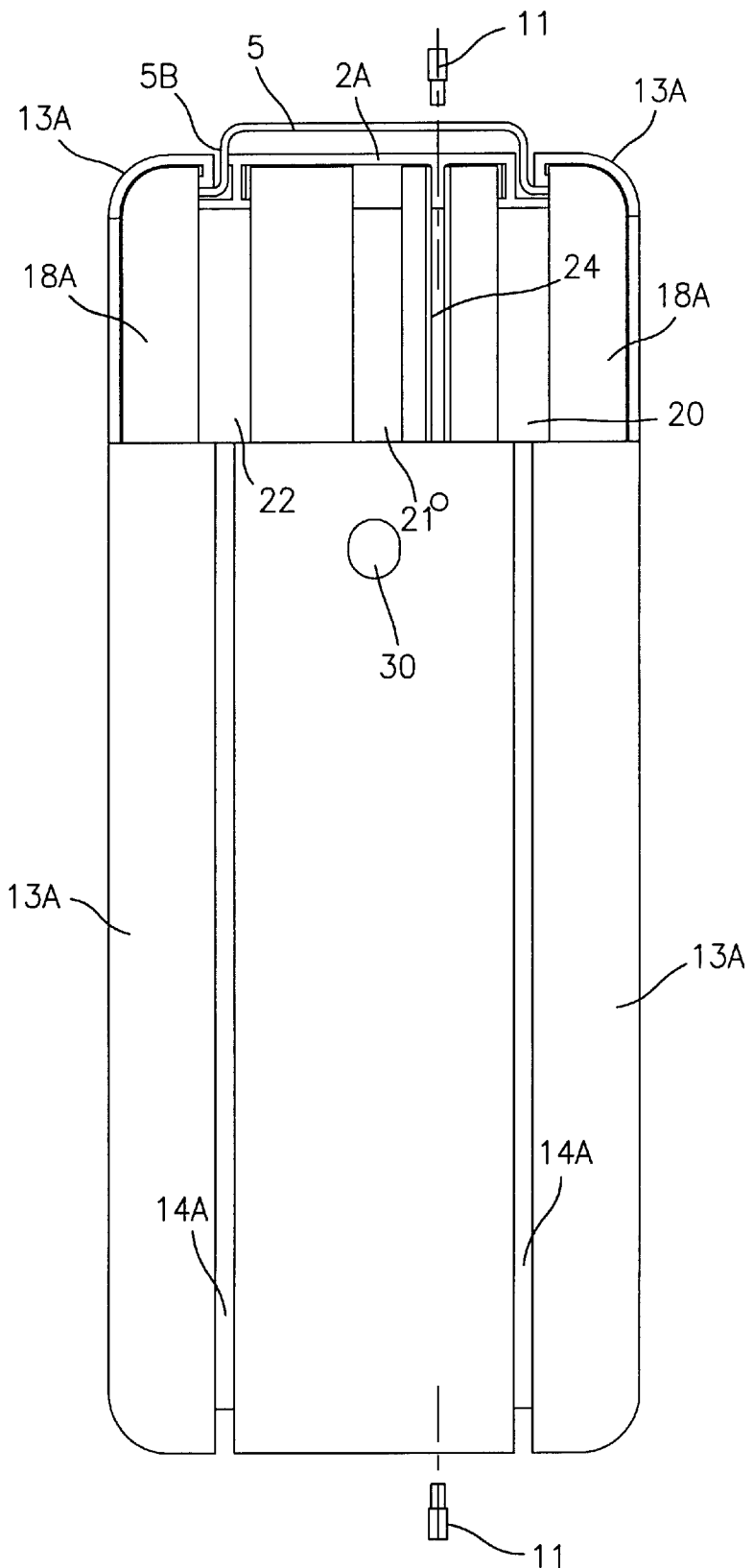
FIG. 5 is an end view of the CPU holder shown in FIG. 4 when viewed in the direction of arrow X.

The detailed configuration of the perimeter frame 2 is better illustrated in FIGS. 3–6. Referring first to FIG. 4, it can be seen that the frame 2 has four sides 2', each side 2' comprising a female section 2A and a male section 2B slideable therein. As illustrated, opposite corners of the frame comprise two female sections 2A connected together to form an L-shaped frame member, the opposite corners of the frame comprising two male members 2B connected together to provide an L-shaped frame part. L-shaped corner pieces 10 hold contiguous frame sections 2A or 2B together in known manner so no further description thereof will be given here.

It will be appreciated that as the male frame sections 2B are slidable within the female frame sections 2A, the dimensions of the frame 2 can be readily adjusted to suit the size of the CPU to be supported therein and gripped thereby. Grub screws 11 threadingly fitted in frame sections 2A fix the position of frame part 2B relative to frame part 2A when tightened using Allen key 11A, the end of each grub screw 11 engaging with the outer surface of its associated frame part 2B. Mounting plate 5 can be slidably mounted on the top frame part 2A in a manner to be described in more detail hereafter. Moulded rubber strips 12 are mounted in slot 23 on the inside surface of the top and bottom frame parts 2B (see FIGS. 4 and 11).

Figure 9:
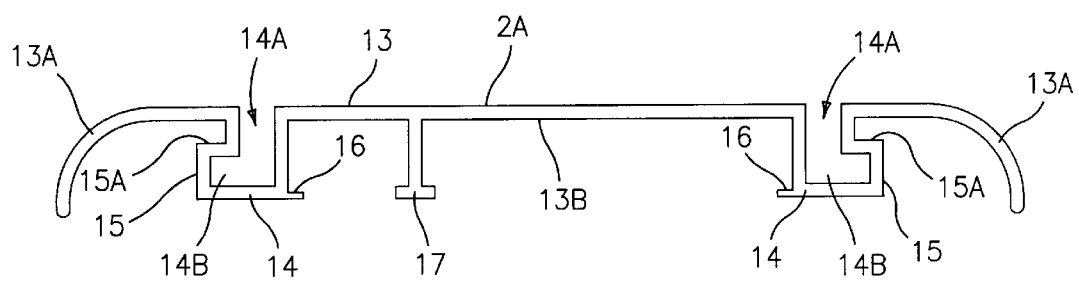
FIG. 9 is a cross section through the extrusion which forms the first frame side part.
Figure 10:
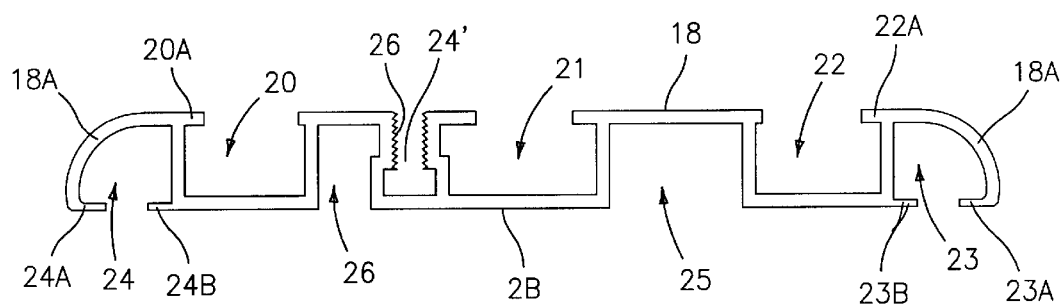
FIG. 10 is a cross section of the extrusion which forms the second frame side part.

Referring now to FIGS. 9 and 10, it can be seen that the frame parts 2A and 2B are each formed as a metal extrusion of constant cross section along its entire length. Referring first to the female member 2A shown in FIG. 9, it can be seen that it comprises a planar upper surface 13 with curved side edges 13A and an undersurface 13B. A pair of hollow L-shaped ribs 14 extend downwardly from the undersurface 13B, each rib having a laterally extending foot 15 providing a rebate 15A adjacent the undersurface of the curved edge 13A. A lateral flange 16 extends from the bottom of the foot 15 in the opposite direction thereto. Access to the hollow interior of the L-shaped ribs 14 is via slot 14A formed in the upper surface 13 of the female member 2A and the hollow interior includes a rebate 14B.

An inverted T-shaped leg 17 extends downwardly from the undersurface 14 between the L-shaped ribs 11.

As the female member 2A is an extrusion of constant cross section, the slots 14A in the upper surface 13 are parallel to each other as are the ribs 14 and the T-shaped leg 17 extending from the undersurface of rib 14.

Referring now to FIG. 10, there is shown the male frame part 2B which is a metal extrusion of the shape indicated which has formed in its external surface 18 a first slot 20, a second slot 21 and a third slot 22. The edges of the frame part are curved at 18A. The outer edge of the first slot 20 has an inwardly directed lip 20A formed thereon and the outer edge of the third slot 22 has an inwardly directed flange 22A formed thereon. A fourth slot 24' is provided between the first and second slots 20, 21 which is of an inverted T-shape, the sidewalls of said slot have serrations 26 thereon.

The second male frame part 2B also includes a fifth slot 23 formed therein behind curved edge 18A and a sixth slot 24 formed behind opposite curved edge 18A. The fifth slot has inwardly directed flanges 23A and 23B along its facing edges and the sixth slot 24 also has identical inwardly facing flanges 24A and 24B. A seventh slot 25 extends parallel to the fifth slot 23 and an eighth slot 26 extends parallel to sixth slot 24.

Figure 11:
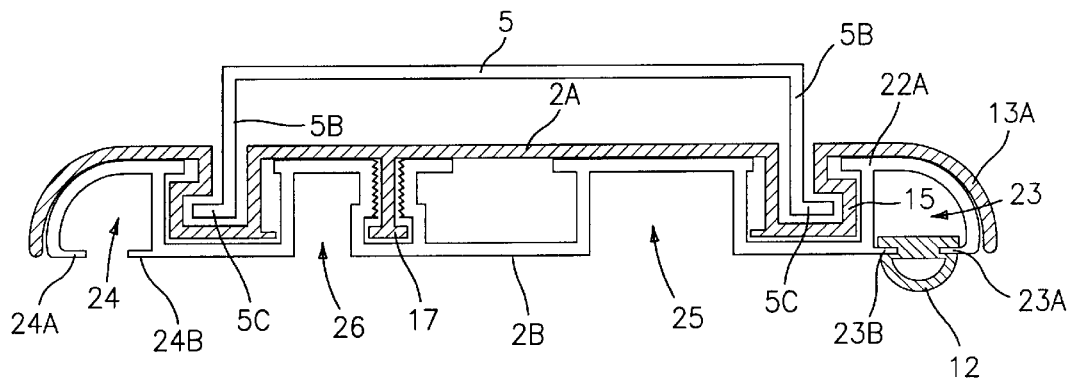
FIG. 11 illustrates the engagement between the male and female sections of the frame of the CPU holder of the present invention.

The way in which the male member engages with the female member can be seen more clearly in FIG. 11 but it will be appreciated that the two members are slidable relative to each other.

Figure 7:
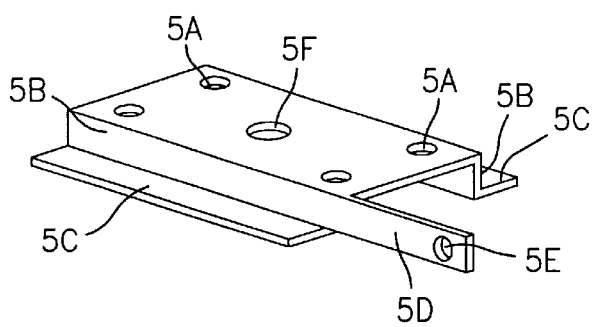
FIG. 7 is a view of the means for attaching the CPU holder to the underside of a desk.
Figure 8:
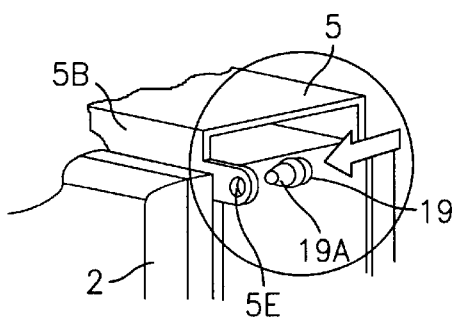
FIG. 8 is a partial view of the mounting means shown in FIG. 7 when fitted to a CPU holder of the invention.

Referring now to FIGS. 7 and 8, there is shown in more detail the mounting means in the form of bracket 5 which has a plurality of holes 5A therein through which screws (not shown) can be fitted to screw the plate 5 to the underside 6 of desk 3. The bracket 5 has a downwardly depending sidewall 5B along its opposite edges with a laterally extending flange 5C extending from the bottom thereof One of the sidewalls 5B has an extension 5D extending forwardly therefrom with a hole 5E in its remote end.

Figure 6:
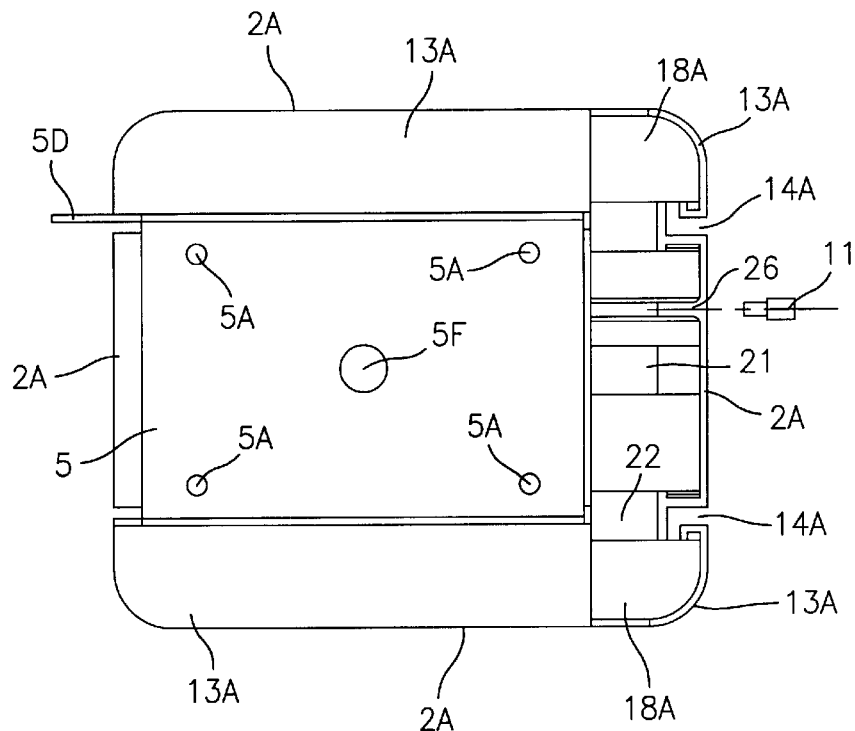
FIG. 6 is an plan view of the CPU holder shown in FIGS. 4 and 5.

The mounting bracket 5 is attached to the perimeter frame 2 by sliding the laterally extending flange 5C into the parallel L-shaped slots 14A in the female member 2A as can be best seen in FIG. 11. In order to fix position of the bracket 5 relative to the perimeter frame 2, a rubber grommet 19 is inserted in the hole 5E in the extension 5D of the side wall 5B so that the nose 19A engages with the frame 2. A central hole 5F is also provided in the bracket 5 as illustrated in FIG. 6.

In order to install a CPU unit 1 in position underneath a desk 24, the fixing bracket 5 is attached to the undersurface 6 of the desk 3 using screws (not shown) inserted through the holes 5A. Having assembled the perimeter frame 2 by fitting the parts 2A and 2B together and releasing the grub screws 11, the adjustable frame is then loosely placed around the CPU 1 and the length of the sides are then slidably adjusted so that the frame 2 closely grips the CPU 1 a degree of resilience provided by the rubber strips 12. The length of each side 2 is then fixed by tightening its associated grub screw 11 using Allen key 11A.

The frame 2 and CPU 1 are now ready to be attached to the fixing bracket 5 already screwed to the undersurface 6 of the desk 3 by sliding the laterally extending flange 5C in the L-shaped slots 14A in the topmost frame part 2A until the end of the fixing bracket 5 abuts the end wall of each slot 14A. In this position, extension 5D of the bracket 5 protrudes beyond the frame 2 so the grommet 19 can be inserted in the hole 5E to fix the position of the hanging bracket relative to the perimeter frame 2 as shown in FIG. 8. To remove the CPU 1 from the frame 2, the reverse procedure is adopted.

Although the CPU holder just described is illustrated in the drawings as supporting the CPU under the desk in a vertical orientation, it can support the CPU in a horizontal orientation by inserting the laterally extending flange 5C of the mounting bracket 5 attached to the underside of the desk 3 in the slots 14A in the larger frame parts 2A and then a slide and rotate locking mechanism (not shown) can be fitted in one of the holes 30 in the perimeter frame 2 which cooperates with a locking member (not shown) also mounted on the frame 2 to prevent unauthorized release of the perimeter frame and removal of the CPU therefrom.

What is claimed is:

1. A holder for attachment to a computer central processing unit (CPU) having an external periphery, said holder comprising:

a perimeter support frame adapted to grip and hold said CPU when inserted therein around the whole of the external periphery of said CPU, said perimeter support frame having a plurality of sides which are constructed and arranged to be variable in length so that the sides of said perimeter support frame can be adjusted to fit closely around the external periphery of said CPU, said perimeter support frame having frame sides having two pairs of diagonally opposed corners and comprising first and second pairs of L-shaped frame members which are slidable relative to each other to adjust the length and width of the frame, the first pair of frame members at two diagonally opposed corners of the frame being identical in shape and cross section but different from the second pair of frame members at the other two diagonally opposed corners of the frame, said second pair of frame members being identical in shape and cross section to each other, each frame member of the second pair of frame members being slidably received in each frame member of the first pair of frame members, and;

mounting means for attaching said support frame to an underside of a desk or work surface and;

locking means to fix and retain a selected length of each frame side whereby the frame grips around the periphery of said CPU and retains said CPU therein.

2. A CPU holder as claimed in claim 1 wherein the frame has four sides, each of which has an inside surface which contacts and grips a face of the CPU when inserted therein.

3. A CPU holder as claimed in claim 1 wherein each L-shaped frame member comprises two identical extruded sections of the same cross sectional configuration which are connected together at a corner junction.

4. A CPU holder as claimed in claim 1 wherein the first and second frame parts are extruded metal sections of constant cross-section along the whole of their length.

5. A CPU holder as claimed in claim 4 wherein the first frame parts are of a first cross-sectional configuration and the second frame parts are of a different cross-sectional configuration.

6. A holder for attachment to a computer central processing unit (CPU) having an external periphery, said holder comprising:

a perimeter support frame adapted to grip and hold said CPU when inserted therein around the whole of the external periphery of said CPU, said perimeter support frame having a plurality of sides which are constructed and arranged to be variable in length so that the sides of said perimeter support frame can be adjusted to fit closely around the external periphery of said CPU, said support frame comprising four L-shaped frame members, each of said frame members being slidable relative to a contiguous frame member to adjust the length of a side of the frame, wherein two of the L-shaped frame members slidably fit into the other two L-shaped frame members, and wherein each L-shaped frame member comprises two identical extruded sections of the same cross sectional configuration which are connected together at a corner junction, and wherein two of the frame members form a first pair of diagonally opposing corners and have an identical cross sectional configuration, and wherein the other two frame members form a second pair of diagonally opposite corners of the frame and have a cross sectional configuration which is identical to each other but different from the frame members forming said first pair of corners;

mounting means for attaching said support frame to an underside of a desk or work surface, and;

locking means to fix and retain a selected length of each frame side whereby the frame grips around the periphery of said CPU and retains said CPU therein.

7. A holder for attachment to a computer central processing unit (CPU) having an external periphery, said holder comprising:

a perimeter support frame adapted to grip and hold said CPU when inserted therein around the whole of the external periphery of said CPU, said perimeter support frame having a plurality of sides which are constructed and arranged to be variable in length so that the sides of said perimeter support frame can be adjusted to fit closely around the external periphery of said CPU, wherein each frame side comprises a first part which is slideable relative to a second part, and wherein the first frame side part has an internal and external surface, the external surface having a pair of parallel L-shaped slots extending along the whole length thereof, each second frame side part fitting over and sliding along the external surface of the first frame side part and having an undersurface with a pair of parallel L-shaped ribs extending therefrom, each of said ribs being received and retained in said L-shaped slots and slideable therealong;

mounting means for attaching said support frame to an underside of a desk or work surface, and;

locking means to fix and retain a selected length of each frame side whereby the frame grips around the periphery of said CPU and retains said CPU therein.

8. A CPU holder as claimed in claim 7 wherein a third inverted T-shaped slot is formed in the external surface of each first frame side part and extends along the whole length thereof parallel to and between said first pair of L-shaped slots, each second frame side part having a T-shaped rib extending from the undersurface thereof which is received and retained in said third slot and slidable therealong.

9. A CPU holder as claimed in claim 8 wherein the locking means comprises a screw which engages with side walls of the third slot to lock the first frame part in position relative to the second frame part.

10. A CPU holder as claimed in claim 7 wherein the L-shaped ribs are hollow and a pair of parallel mounting slots are formed in the external surface of the first member, each mounting slot providing access to an interior of the hollow of the respective L-shaped rib.

11. A CPU as claimed in claim 10 wherein the mounting means is a bracket which can be secured to the undersurface of a desk or work surface, said bracket including a plate with a pair of parallel L-shaped flanges extending therefrom at 90° to a plane of the plate, each of said flanges being slideably received in one of said mounting slots to releasably attach said plate to the perimeter support frame.

* * * * *